May 30, 1944. O. L. STARR 2,349,919
FITTING OF MEMBERS
Filed July 8, 1940 3 Sheets-Sheet 1
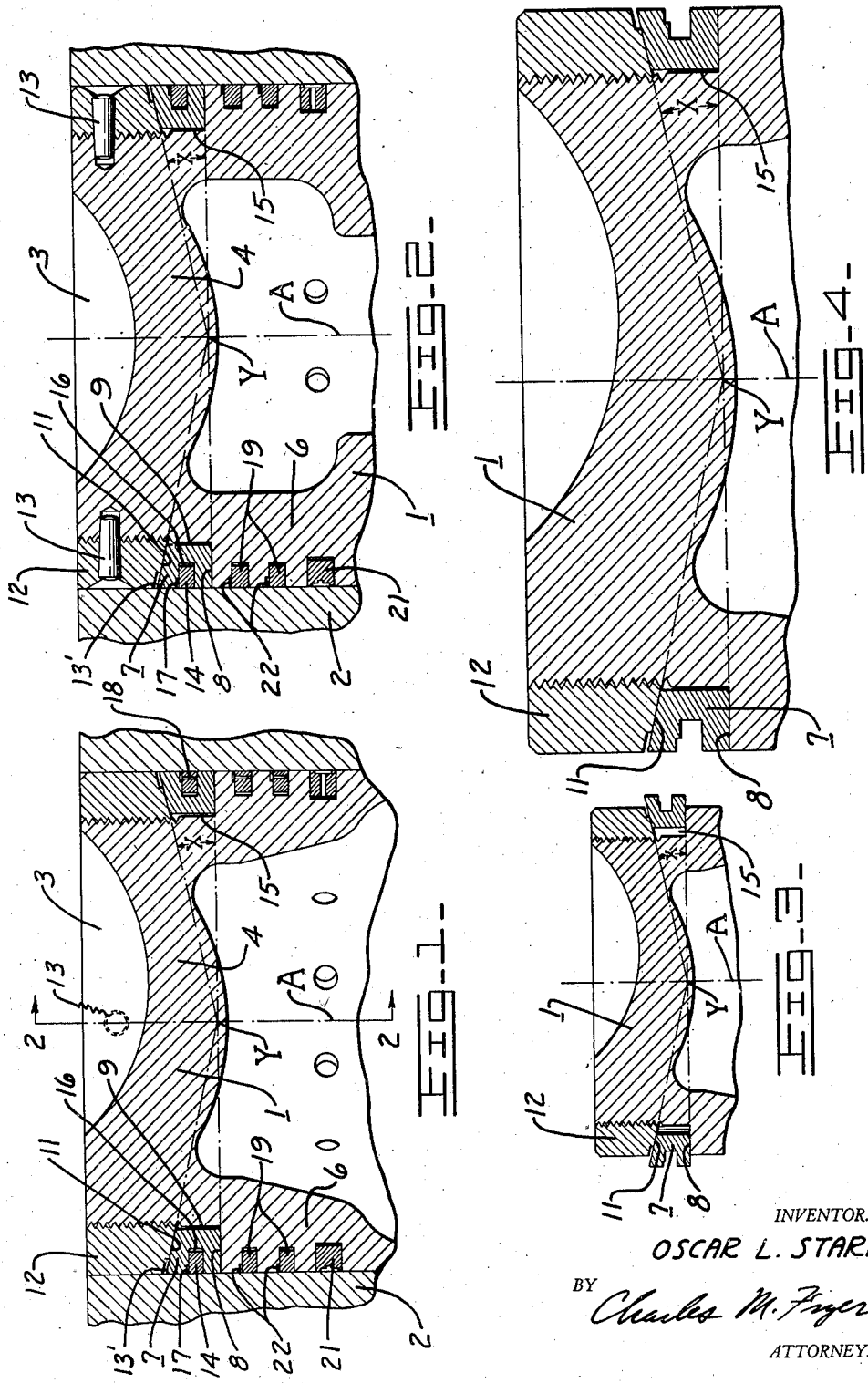
INVENTOR.
OSCAR L. STARR
BY Charles M. Fryer
ATTORNEY.

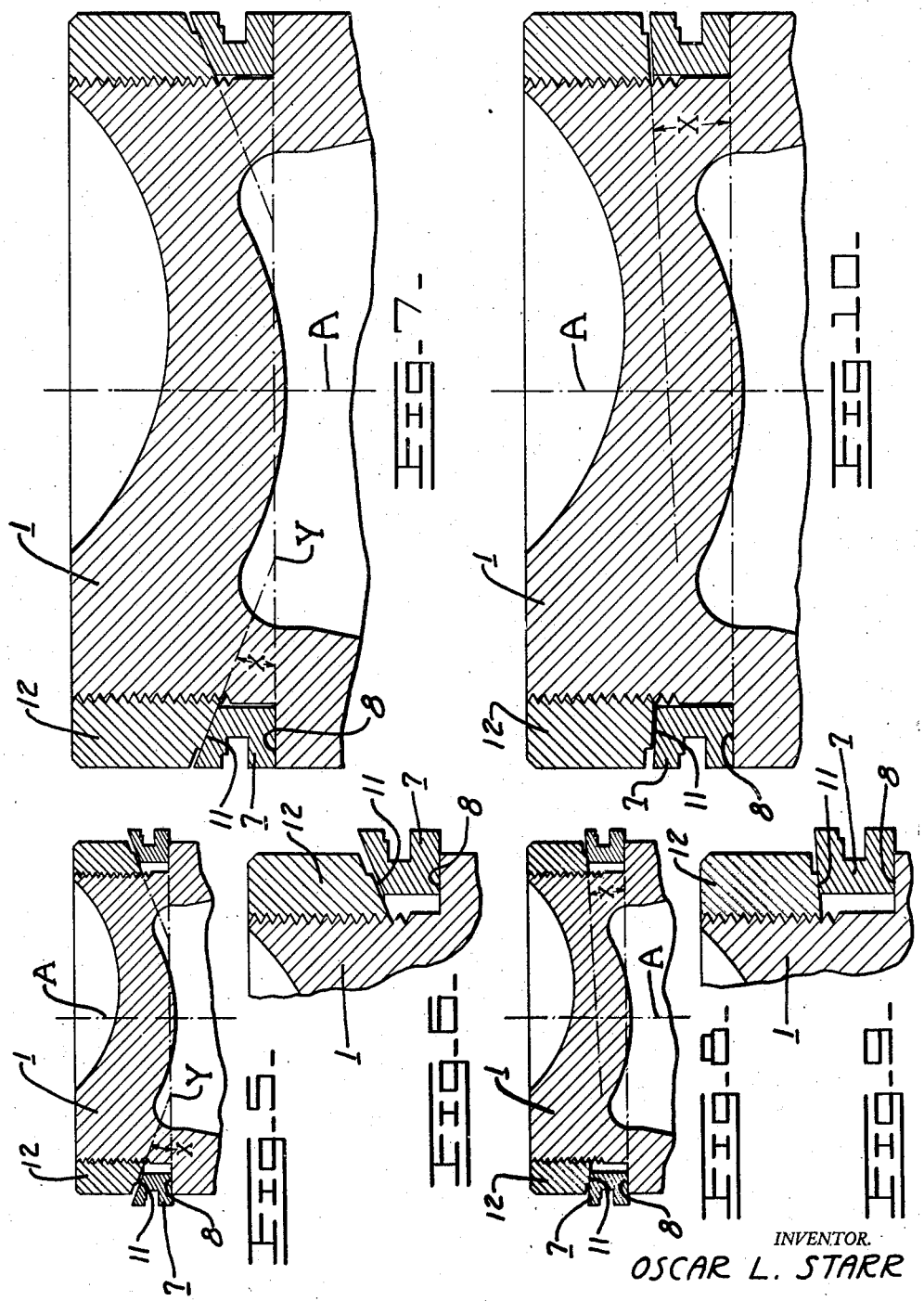

May 30, 1944.　　　O. L. STARR　　　2,349,919
FITTING OF MEMBERS
Filed July 8, 1940　　　3 Sheets-Sheet 3
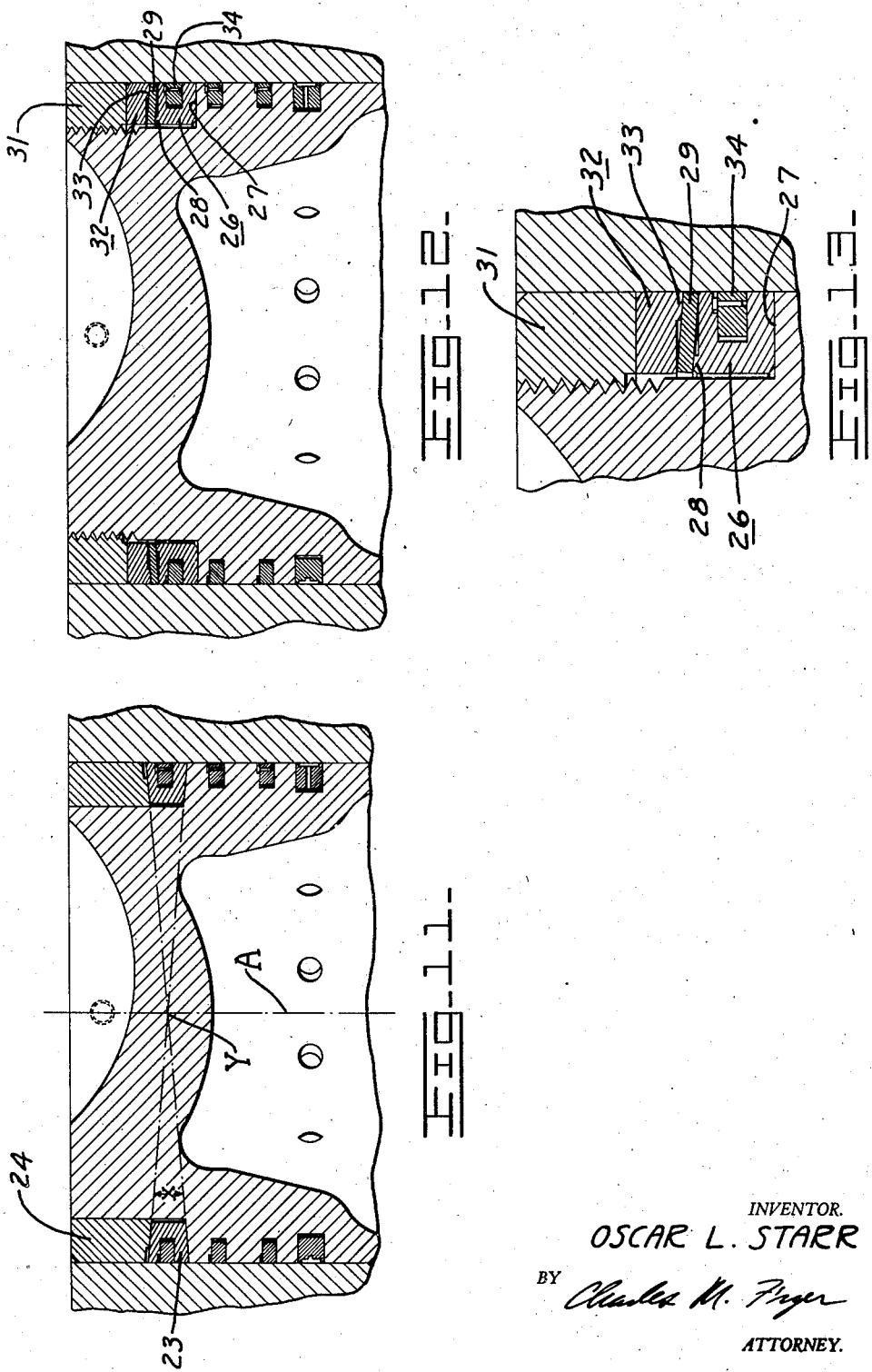
INVENTOR.
OSCAR L. STARR
BY
ATTORNEY.

Patented May 30, 1944

2,349,919

UNITED STATES PATENT OFFICE 2,349,919

FITTING OF MEMBERS

Oscar L. Starr, Mission San Jose, Calif., assignor to Caterpillar Tractor Co., San Leandro, Calif., a corporation of California Application July 8, 1940, Serial No. 344,306

11 Claims. (Cl. 309—29)

My invention relates to control of the fit between members under varying temperature conditions, and more particularly to providing predetermined control of the fit of an annular member seated in the periphery of a piston.

In my co-pending application, Serial Number 344,304, filed July 8, 1940, entitled "Piston," I have disclosed a piston which has mounted in the periphery thereof an annular member free of molecular union with the body of the piston. Such annular member is a piston ring groove band in which a piston ring is adapted to be seated in a groove formed in the band instead of in the body of the piston. As is explained more fully in the specification of such application, the piston body is of a relatively soft metal, such as aluminum, which is advantageous because of lightness and high heat conductivity; and the band is of harder metal, such as cast iron, to provide a wear resistant seat for a piston ring seated in the ring groove, so as to preclude wear between the piston ring and its seating groove, and thereby enhance maintenance of proper sealing relationship of the piston ring in such groove and with a cylinder wall. Also, the band, being free of molecular union with the body of the piston, has a limited degree of freedom of movement which is desirable because then the piston ring mounted thereon will not follow all distortions of the piston resulting from temperature variations. Such band although it seats in the piston with slight radial or transverse clearance at its inner side, is held between seating surfaces which extend transversely with respect to the piston axis. Thus the band has a fit in the piston in an axial or longitudinal direction with reference to the piston axis. In the following description, the terms "longitudinal" or "axial" are employed for designating such fit of the annular member or band.

Since the ring groove band is preferably of cast iron while the body of the piston is preferably of aluminum, the body has a greater coefficient of expansion. As a result, should the band be seated between parallel seating surfaces extending transversely with respect to the piston axis, and should it have an axially tight fit when the parts are cold, it becomes loose when the parts are subjected to engine operating temperatures. Hence, the piston ring seated in such axially loose band may not be maintained in proper sealing alinement with respect to the cylinder wall, which would result in loss of sealing efficiency. Also, an axially loose band might permit leakage between it and the piston body, which is obviously undesirable. Such looseness of the band under engine operating temperatures becomes aggravated as the operating life of the piston progresses because of the forces resulting from movement of the piston in a cylinder. Even if the dimensions of the parts are chosen so that the band will originally have a proper tight axial fit between parallel seating surfaces, under engine operation temperatures, it may fit too tight when cold which might cause distortion of the band with consequent misalinement of the piston ring. Should the band and the body of the piston be of the same material, the band being at the periphery of the piston and consequently in contact with the cylinder wall, might be at a different temperature than the body of the piston under engine operating conditions. Therefore, it would have a different degree of expansion and might become loose which is undesirable for the reason previously explained.

My invention is designed to overcome the above-described problem and has as its objects, among others, the provision of means for maintaining a predetermined controlled fit between members under varying temperature conditions, and particularly a substantially tight non-distorting fit of an annular member mounted in the periphery of a piston, irrespective of the temperature to which such piston may be subjected. Other objects of my invention will become apparent from a perusal of the following description thereof.

In general, my invention takes advantage of the phenomenon that, irrespective of shape, every body during expansion or contraction thereof, resulting from changes in temperature, will always change its size proportionally with respect to a neutral locus which may be also designated as a reference base unaffected by changes in temperature. In the case of a sphere, such locus is a point, namely, the center of the sphere; while in the case of a cylindrically shaped body, such as an internal combustion engine piston, the locus is the axis of the cylinder. The latter is also true with respect to prismatically shaped bodies; and even with respect to an irregularly shaped body, wherein such locus may be a curved line, all sections of such body transverse to the locus will expand and contract proportionally with reference thereto. With respect to an annular or ring like member seated in the periphery of any of such bodies so as to surround such locus or unaffected reference base, I control the fit of the member under varying temperature conditions, by seating such member between transversely extending surfaces formed in the body and which are inclined with respect to each other to form an angle, the apex of which has a predetermined relationship with respect to the locus of expansion and contraction. If such angle apex is substantially on the locus of expansion or contraction, a tight non-distorting fit will be maintained at all times irrespective of temperature conditions, but by locating it so as to have a predetermined spaced relationship with respect to such locus, the parts may be caused to have a tight fit when hot and a loose fit when cold, or vice versa, as will be explained more fully hereinafter.

In the preferred form of piston wherein my invention is now employed, the above-described ring band is formed with seating surfaces seated between complementary seating surfaces in the periphery of the piston, and which extend transversely with respect to the piston axis and are inclined with respect to each other to make an angle having its apex substantially on the axis of the piston to provide a substantially constantly tight non-distorting and uniform axial fit irrespective of whether the piston is hot or cold. Thus, the piston ring will always be properly alined with respect to the cylinder wall, and be properly seated in its seating groove with the sides thereof parallel to the sides of such seating groove. As an alternative but not as desirable means for maintaining the substantially tight axial fit, irrespective of whether the piston is hot or cold, such band may be held in position by resilient means thrusting against it.

A loose axial fit may be provided between the band and the remainder of the piston when the parts are cold and a tight axial fit when the parts are hot by rendering the angle of the seating surfaces excessive compared to the size of the angle having its apex substantially on the axis of the piston, so that the apex is spaced from the axis and is at a less distance from the periphery of the piston than the radial distance. On the other hand, a loose axial fit may be provided between the parts when they are hot and a tight axial fit when cold by rendering the angle insufficient compared to the size of the angle having its apex substantially on the axis of the piston, so that the apex is spaced from the axis and is at a greater distance from the periphery of the piston than the radial distance.

Reference is now made to the drawings for a more detailed description of the invention.

Fig. 1 is a fragmentary vertical sectional view through a piston and cylinder when the parts are at room temperature, illustrating the feature of my invention employed therein.

Fig. 2 is a section taken in a plane indicated by line 2—2 in Fig. 1.

Fig. 3 is a reduced scale fragmentary vertical sectional view of the piston of Figs. 1 and 2; the relationship of the band with respect to its seating groove being exaggerated, to illustrate how the ring groove band seats when the parts are at room temperature.

Fig. 4 is a view of the piston of Fig. 3 expanded by heat to illustrate how the ring groove band seats when the piston is substantially at working temperature; the size of the piston of Fig. 4 being exaggerated.

Fig. 5 is a reduced scale fragmentary vertical sectional view of a piston at room temperature provided with a different character of ring groove band mounting; the relationship of the band with respect to its seating groove being exaggerated, to illustrate how the band may be made to have a loose fit when the piston is at room temperature.

Fig. 6 is an enlarged fragmentary section of the ring groove band and the piston seating portion therefor of the piston appearing in Fig. 5.

Fig. 7 is a view of the piston of Fig. 5 expanded by heat to illustrate how the ring groove band seats when the piston is substantially at working temperature; the size of the piston of Fig. 7 being exaggerated.

Fig. 8 is a reduced scale fragmentary vertical sectional view of a piston at room temperature provided with a still different character of ring groove band mounting; the relationship of the band with respect to its seating groove being exaggerated, to illustrate how the band may be made to have a tight fit when the piston is at room temperature.

Fig. 9 is an enlarged fragmentary section of the ring groove band and the piston seating portion therefor of the piston appearing in Fig. 8.

Fig. 10 is a view of the piston of Fig. 8 expanded by heat to illustrate how the ring groove band seats when the piston is substantially at working temperature; the size of the piston of Fig. 10 being exaggerated.

Fig. 11 is a fragmentary vertical sectional view through a piston and cylinder, illustrating a modified form of construction.

Fig. 12 is a fragmentary vertical sectional view through a piston and cylinder, illustrating a further modification.

Fig. 13 is an enlarged fragmentary vertical section of the ring groove band and the piston seating portion therefor of the piston appearing in Fig. 12.

Although the principle of my invention may be employed in any body having a band or ring like member mounted in a peripheral portion thereof, I have illustrated it in connection with a preferred form of piston, disclosed in my previously mentioned co-pending application, and which is now employed in a compression ignition (Diesel) engine manufactured by my assignee. With reference to Figs. 1 and 2, such piston comprises aluminum piston body 1 adapted to work in cylinder wall 2, and which is provided with an offset substantially spherical combustion crater 3 in the crown thereof; the under wall 4 of such crater being tapered to effect uniform flow of heat to the peripheral ring belt portion 6 of the piston. An annular member in the form of a cast iron one piece or integral unbroken ring groove band 7, independent of the body 1 of the piston, is seated in the periphery of the piston adjacent its crown; the seating of such band being in a peripheral groove about piston axis A; one surface 8 of which groove is formed on a shoulder resulting from the provision of a peripheral recess 9 formed in the top peripheral portion of the piston. The opposite surface 11 of such peripheral groove for seating band 7 is formed on internally threaded securing ring or nut 12 having a screw connection in recess 9 with piston body 1, and which is preferably of the same material as the body of the piston, namely aluminum, but which may be of any other suitable material.

By turning securing ring 12 the correct number of turns, the proper degree of pressure may be applied to hold or clamp ring groove band 7 firmly in position; and because of such firm holding of the band, it cannot rotate about the axis of the piston. To prevent rotational movement of securing ring 12 after it is once screwed on the piston the proper extent, I provide tapered one-thousandths (.004 to .006) of an inch at room temperature.

The size of angle X is theoretically immaterial, but is governed in manufacture of the piston by the outside diameter of the piston and the axial width of band 7 at its periphery. Although in the preferred construction, the side of the angle determined by upper seating surface 11 makes an oblique angle with respect to the axis A, and the side determined by lower seating surface 8, which is on the shoulder formed by peripheral recess 9 in the body of the piston, is substantially at a right angle with respect to axis A, the side determined by seating surface 8 may be also inclined or slanted so as to form an oblique angle with respect to axis A. However, I preferably make lower seating surface 8 and the complementary seating surface on band 7, extend at a right angle with respect to axis A, because such arrangement renders it easier to manufacture a substantially perfect transverse seat between the band and such shoulder, and thus provide for more perfect alinement of ring 14 with the cylinder wall 2. In this connection, the inclination of upper seating surface 11, which is on ring 12, and the inclination of the complementary surface on band 7, provide conical surfaces which when engaged by securing of ring 12 facilitate centering of band 7 on the piston to provide uniform peripheral clearance at inside radial clearance space 15.

In a construction wherein body 1 of the piston and securing ring 12 are of a metal, such as aluminum, having a greater coefficient of expansion than band 7, Figs. 5, 6 and 7 illustrate how band 7 may be made to have a loose axial fit with the piston cold and a tight fit at a predetermined higher operating temperature. Seating surfaces 8 and 11 are so inclined with respect to each other as to render angle X excessive or greater than such angle would be if its apex were substantially on axis A for obtaining the substantially constantly tight uniform fit under all temperature conditions. As a result, the apex Y of the angle will be spaced from axis A and be a less distance from the periphery of the piston than the radial distance. Thus if band 7 has a loose axial fit with the piston at room temperature, as is illustrated in Fig. 5, it can be made to have a tight fit at a predetermined higher operating temperature as is illustrated in Fig. 7, depending upon the distance apex Y is from the axis A of the piston, which latter is a function of the extent to which the angle is rendered excessive. If band 7 were of a material having a higher coefficient of expansion than the remainder of the piston, then if the angle X is rendered excessive, the reverse can be made to occur, namely, the band can be made to have a tight axial fit when the piston is cold and a loose axial fit when the piston is hot. However, as was previously mentioned, a substantially constantly tight uniform fit may be obtained under all temperature conditions irrespective of the materials of band 7, piston body 1, and securing ring 12, by having the apex Y of angle X substantially on the axis A of the piston.

In actual practice, it is desirable to have the angle slightly excessive so that its apex Y is a slight distance from axis A and at a less distance from the periphery of the piston than the radial distance, to compensate for any errors that may result from manufacturing tolerances and insure that at operating temperature of the piston the band will be held tight. In a piston wherein my invention is employed which is about four and one quarter (4.25) inches in diameter and the outside axial width of band 7 is about one-half (0.5) inch, the angle X is rendered excessive to the extent of positioning apex Y about one one-hundredth (0.01) of an inch from axis A, for the reasons stated. Thus, even though not exactly on the axis A of the piston, the angle apex Y is substantially on such axis.

Figs. 8, 9 and 10 illustrate how band 7, which has a lower coefficient of expansion than the remainder of the piston, can be made to have a tight axial fit when cold and a loose axial fit when hot. For this purpose, the angle X formed by the inclination of seating surfaces 8 and 11 is rendered insufficient or less than such angle would be if its apex were substantially on axis A. As a result, the apex will be spaced from axis A and be a greater distance from the periphery of the piston than the radial distance. Thus, if band 7 has a tight axial fit when the piston is cold, as is illustrated in Fig. 8, it will become looser axially as the piston becomes heated, as is illustrated in Fig. 10. The distance the apex of angle X is from axis A, or in other words the extent to which the angle is rendered insufficient, will determine the temperature at which a proper tight fit may be obtained. If band 7 were to have a higher coefficient of expansion than the remainder of the piston, then the insufficient angle can be made such as to provide the reverse, namely a loose axial fit when cold and a tight axial fit when hot.

Although I find my invention particularly applicable at present in a piston having a peripheral ring groove band, it is believed apparent from the preceding explanation, that the principle thereof is applicable in any object or body having an annular or ring like member to be mounted on or mounted in the periphery thereof; and this is so irrespective of whether such ring like member and the peripheral portion of the body for mounting thereof form a true circle. For example, such principle may be applied to a body having an irregular shape, and a band mounted in the periphery of such body and having a peripheral shape corresponding to the peripheral shape of the portion of the body in which it is adapted for mounting.

As was previously mentioned, both of the seating surfaces of the band and the complementary seating surfaces of the groove in which the band is mounted may be transversely inclined at an oblique angle with respect to the axis A of the piston. Fig. 11 shows such arrangement with the apex Y of angle X substantially on piston axis A, to provide a constantly tight uniform axial fit of band 23 in its seating groove under all temperature conditions. In the modification of Fig. 11, I have shown an alternative means for securing the ring groove band. Securing ring 24 is shrunk over the periphery of the piston adjacent the crown to hold band 23 in position, instead of the threaded securing ring previously described.

Figs. 12 and 13 illustrate a further modification wherein a different form of means is employed to maintain the ring groove band with a tight fit irrespective of temperature variations. Band 26 seats on transverse shoulder 27 and has an inner peripheral flange 28 on its top surface. A relatively narrow flat ring 29 of resilient material, such as steel, is seated over band 26 in engagement with flange 28. Interposed between threaded securing ring 31 and ring 29 is another securing pins 13. Preferably, the underside of securing ring 12 is formed with a peripheral recess or channel 13' so as to avoid application of pressure directly over the outer peripheral portion of band 7, and hence obviate pinching of a piston ring 14 which would result in undesirable distortion thereof. From the preceding it is seen that band 7 is fitted or seated in a groove in the piston, between spaced apart surfaces 8 and 11 which extend transversely with respect to the axis A of the piston. Such band 7 has complementary spaced apart seating surfaces engaging the surfaces 8 and 11, but its inside diameter is such as to provide slight inside radial clearance 15 with respect to the body of the piston. Consequently, the band has an axial or longitudinal fit in the piston.

Top compression ring 14 is seated in a ring groove 16 formed in band 7; the upper side of such ring groove being formed with blow-by minimizing channel 17, more fully described, and claimed in my co-pending application Serial Number 344,305, filed July 8, 1940, entitled "Piston construction." A projecting pin member 18 is fixed to compression ring 14 to clean out carbon from channel 17, as is also described more fully, and claimed in such application. Ring belt portion 6 of the piston also supports additional compression rings 19 and an oil ring 21; blow-by minimizing channels 22 being also preferably formed in the upper sides of the ring grooves for compression rings 19. Although band 7 is shown with only one compression ring mounted thereon, it may be made axially wider to support a plurality of such rings if so desired.

The body 1 of the piston being preferably of a metal of relatively high heat conductivity, such as aluminum, has a greater coefficient of expansion than band 7, which in order to provide a wear resistant seat for piston ring 14, is of harder metal, such as cast iron. Therefore, if such band 7 were mounted in a conventional form of seating groove having parallel seating surfaces extending transversely with respect to the piston axis A, and made to have a tight axial fit therein when the piston is at room or normal temperature, it would become axially loose as the piston heated up under working conditions, resulting in play with consequent misalinement and loss of sealing efficiency of piston ring 14. Furthermore, if band 7 were to have a greater coefficient of expansion than the body of the piston, it would not have a uniform tight axial fit under all temperature conditions to which the piston might be subjected, which would also result in misalinement of the piston ring therein. Even if band 7 were of the same material as that of body 1 of the piston, play or distortion thereof might very readily occur under varying temperature conditions, because the band being at the periphery of the piston in contact with the cylinder wall under operating conditions and temperatures, is maintained cooler than the interior of the piston body, and would, therefore, expand and contract to a different degree. Furthermore, such peripheral band is adjacent the crown of the piston, the central portion of which is hotter under operating conditions than the periphery of the piston. Consequently, this also causes the band to be cooler, so as to expand or contract to a different degree.

I have found that predetermined control of the axial fit of band 7 in the piston under varying temperature conditions, can be obtained by inclination of the groove seating surfaces 8 and 11 with respect to each other and by similar inclination of the complementary seating surfaces on band 7, to form an angle X, the apex Y of which has a predetermined relationship with respect to the axis A of the piston. In this connection, it should be kept in mind that the body of the piston being substantially cylindrically shaped will expand or contract uniformly with respect to axis A as a locus when all portions thereof are subjected to the same temperature changes; and the various figures formed during such expansion or contraction will all be similar to the shape of the piston body at room or normal temperature. Band 7, being circular and being substantially concentric with respect to the axis A will also expand or contract uniformly with respect to such axis A when subjected to the same temperature changes. Hence, if angle X, irrespective of shape or size, is such that its apex Y lies substantially on axis A, then band 7 will always have a substantially constantly tight uniform axial fit between seating surfaces 8 and 11, irrespective of whether the piston is hot or cold. This is true irrespective of the materials of band 7, piston body 1, and securing ring 12.

With respect to my preferred form of piston construction illustrated in Figs. 1 and 2, angle X is shown such that its apex Y lies substantially on axis A to maintain the described constantly tight uniform axial fit under all varying temperatures to which the piston may be subjected. However, in the actual piston manufactured by my assignee, such angle apex is spaced a slight distance from the axis (but may be considered substantially thereon) for a reason to be subsequently explained. Figs. 3 and 4 illustrate graphically how such fit remains substantially constant during temperature changes. Fig. 3 depicts the piston at room temperature but exaggerates the relationship of band 7 in its seating groove; while Fig. 4 illustrates the piston expanded by heat to substantially operating temperature, the size thereof compared to Fig. 3 being exaggerated but the parts thereof being shown in substantially proper relationship. From these views, it can be seen that although there is transverse displacement of band 7 with respect to the body of the piston during expansion or contraction, nevertheless a substantially constantly tight uniform fit of band 7 between seating surfaces 8 and 11 will always obtain. In this connection, as was previously explained, body 1 of the piston, being preferably of aluminum, has a greater coefficient of expansion than band 7 which is preferably of cast iron. Consequently, as can be observed from comparison of Figs. 3 and 4, the inside radial clearance space 15 between band 7 and body 1 becomes less as expansion of the parts occurs by heat. It is for this reason that the radial clearance space 15 is provided, because if band 7 were to fit tight radially against the piston body when the parts are at room temperature, then when the parts expanded to their size under substantially operating temperature of the piston, the fit would be too tight causing undesirable distortion which my invention is designed to obviate. Therefore, clearance space 15 is such that when the parts are at room temperature, sufficient space still remains when the parts have expanded to their size at substantially operating temperature, to preclude radial binding of the band against the piston body. In the piston illustrated in Figs. 1 and 2, which has an outside diameter of about three and one-half (3.5) inches at peripheral recess 9 in which band 7 lies, the clearance space 15 is about four to six ring 32 having an outer peripheral flange 33 on its underside in engagement with ring 29. Because of the resilient character of ring 29 and the opposed relationship of flanges 28 and 33, band 26 is resiliently thrust against seating shoulder 27. As expansion or contraction occurs in an axial direction, resulting from changes in temperature, the resilient means, including ring 29, will yield to permit such changes, but at the same time will always maintain band 26 with a tight fit in its seating groove, to thereby maintain proper alinement of piston ring 34 seated in the band. If desired ring 32, may be omitted, and flange 33 formed directly on securing ring 31 which may be made axially wider for this purpose. The modification of Figs. 12 and 13 is not as desirable as the preferred form of the invention illustrated in Figs. 1 and 2, because the latter construction is more durable and simple, and more economical to manufacture.

I claim:

1. A piston having in the periphery thereof an annular member seated between surfaces inclined with respect to each other to form an angle the apex of which is spaced a predetermined distance off the axis of said piston for providing a predetermined loose or tight fit of said member at a predetermined temperature within a varying temperature range.

2. A body having a locus from which expansion and contraction occurs resulting from changes in temperature and having in the periphery thereof a member seated between surfaces inclined with respect to each other to form an angle the apex of which is spaced a predetermined distance off said locus for providing a predetermined loose or tight fit of said member at a predetermined temperature within a varying temperature range.

3. A piston provided with a peripheral groove having spaced apart seating surfaces extending transversely with respect to the axis of said piston, and an annular member seated in said groove and having complementary spaced apart seating surfaces engaging said groove seating surfaces, said surfaces engaging in planes inclined with respect to each other to form an angle the apex of which is spaced a predetermined distance off said piston axis for providing a predetermined loose or tight fit between said groove and said member at a predetermined temperature within a varying temperature range as said groove and said member expand or contract.

4. A piston comprising a body having a peripheral recess adjacent the crown thereof and which forms a peripheral shoulder having a seating surface, a piston ring groove band having a seating surface engaging said shoulder seating surface and also an opposite seating surface, and a securing ring in said recess over said band and having a seating surface engaging said opposite seating surface of said band; said shoulder seating surface and said band seating surface in engagement therewith lying in a plane at substantially a right angle with respect to the axis of said piston, and said securing ring seating surface and said band seating surface in engagement therewith being inclined with respect to said plane to form an angle the apex of which lies substantially on said piston axis to provide a substantially tight fit of said band between said shoulder and said securing ring under varying temperature conditions.

5. A piston provided with a peripheral groove having spaced apart seating surfaces extending transversely with respect to the axis of said piston, and an anular member seated in said groove, and having complementary spaced apart seating surfaces engaging said groove seating surfaces; said surfaces engaging in planes inclined with respect to each other to form an angle the apex of which although substantially on said piston axis to provide a uniform fit of said member in said groove under varying temperature conditions, is spaced a slight distance from said axis and at a distance from the periphery of the piston less than the radial distance to insure a tight fit at operating temperatures of the piston.

6. The method of providing a predetermined loose or tight fit at a predetermined temperature between a body having a locus from which expansion and contraction occurs resulting from changes in temperature and a member adapted to be seated between surfaces in said body and having a different coefficient of expansion than that of the body, which comprises providing inclination of such surfaces with respect to each other to form an angle, and locating the apex of said angle in such spaced relationship with respect to said locus as to determine said fit at said predetermined temperature.

7. A piston comprising a body of aluminum having a peripheral recess adjacent the crown thereof which forms a peripheral shoulder having a seating surface extending at substantially a right angle with respect to the axis of said piston, an iron piston ring groove band for providing a wear resistant seat for a piston ring and having a seating surface engaging said shoulder seating surface so as to extend also at substantially a right angle with respect to the axis of said piston, said band being free of molecular union with said body and having also an opposite seating surface, and a securing ring in said recess over said band and having a seating surface engaging said opposite seating surface of said band; said securing ring surface and said opposite surface of said band being inclined with respect to said shoulder seating surface to form an angle the apex of which lies substantially on said piston axis to provide a substantially tight uniform fit of said band between said shoulder and said securing ring under varying temperature conditions.

8. A piston comprising a body of aluminum having a peripheral recess adjacent the crown thereof which forms a peripheral shoulder having a seating surface extending at substantially a right angle with respect to the axis of said piston, an iron piston ring groove band for providing a wear resistant seat for a piston ring and having a seating surface engaging said shoulder seating surface so as to extend also at substantially a right angle with respect to the axis of said piston, said band being free of molecular union with said body and having also an opposite seating surface, and a securing ring in said recess over said band and having a seating surface engaging said opposite seating surface of said band; said securing ring surface and said opposite surface of said band being inclined with respect to said shoulder seating surface to form an angle the apex of which although substantially on said piston axis to provide a uniform fit of said band between said shoulder and said securing ring under varying temperature conditions, is spaced a slight distance from said axis and at a distance from the periphery of said piston less than the radial distance to insure a tight fit of said band at operating temperatures of the piston.

9. A piston comprising a body of relatively soft metal such as aluminum or the like, the body having a peripheral recess adjacent the crown thereof which forms a peripheral shoulder having a seating face, an unbroken peripherally grooved piston ring groove band of harder material than the body to provide a wear resistant seat for a piston ring adapted to be seated in its groove, said band being free of molecular union with said body and having a seating face engaging said shoulder seating face and also an opposite face, and a securing ring in the recess over said band firmly clamping the band on the shoulder against rotational movement about the axis of the piston and having a seating face engaging said opposite face of the band; said faces engaging along surfaces inclined with respect to each other, and the straight line generatrices of said surfaces forming an angle the apex of which has a predetermined relationship with respect to the axis of the piston for providing a predetermined fit of said band between said shoulder and said securing ring at a predetermined temperature within a varying temperature range; the contact between said shoulder seating face and said band seating face in engagement therewith being in a plane at substantially a right angle with respect to the axis of said piston, to enhance centering of the band and alinement with respect to a cylinder wall of a piston ring seated in the groove of the band.

10. A piston comprising a body of relatively soft metal such as aluminum or the like, the body having a peripheral recess adjacent the crown thereof which forms a peripheral shoulder having a seating face, an unbroken peripherally grooved piston ring groove band of harder material than the body to provide a wear resistant seat for a piston ring adapted to be seated in its groove, said band being free of molecular union with said body and having a seating face engaging said shoulder seating face and also an opposite face, and a securing ring in the recess over said band firmly clamping the band on the shoulder against rotational movement about the axis of the piston and having a seating face engaging said opposite face of the band, the band fitting with inside radial clearance with respect to the piston body to preclude radial binding of the band against the body and hence preclude distortion; said faces engaging along surfaces inclined with respect to each other, and the straight line generatrices of said surfaces forming an angle the apex of which is spaced off of the axis of the piston a predetermined distance from the periphery of said piston less than the radial distance to provide a tight fit of said band between said shoulder and said securing ring at operating temperatures of the piston.

11. A piston comprising a body of relatively soft metal such as aluminum or the like, the body having a peripheral recess adjacent the crown thereof which forms a peripheral shoulder having a seating face, an unbroken peripherally grooved piston ring groove band of harder material than the body to provide a wear resistant seat for a piston ring adapted to be seated in its groove, said band being free of molecular union with said body and having a seating face engaging said shoulder seating face and also an opposite face, and a securing ring in the recess over said band firmly clamping the band on the shoulder against rotational movement about the axis of the piston and having a seating face engaging said opposite face of the band, the part of said securing ring adjacent the band having a peripheral recess to preclude application of direct pressure to the outer peripheral portion of said band and hence obviate pinching of the piston ring and said band fitting with inside radial clearance with respect to the piston body to preclude radial binding of the band against the body and hence preclude distortion; said faces engaging along surfaces inclined with respect to each other, and the straight line generatrices of said surfaces forming an angle the apex of which has a predetermined relationship with respect to the axis of the piston for providing a predetermined fit of said band between said shoulder and said securing ring at a predetermined temperature within a varying temperature range; the contact between said shoulder seating face and said band seating face in engagement therewith being in a plane at substantially a right angle with respect to the axis of said piston, to enhance centering of the band and alinement with respect to a cylinder wall of a piston ring seated in the groove of the band.

OSCAR L. STARR.